(12) United States Patent
Zhang et al.

(10) Patent No.: US 11,889,537 B2
(45) Date of Patent: Jan. 30, 2024

(54) RULES FOR UPDATING SLOT FORMAT SUPPORTING FULL DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US); Junyi Li, Franklin Park, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/246,614

(22) Filed: May 1, 2021

(65) Prior Publication Data

US 2022/0353867 A1  Nov. 3, 2022

(51) Int. Cl.
| | |
|---|---|
| H04W 4/00 | (2018.01) |
| H04W 72/53 | (2023.01) |
| H04L 5/14 | (2006.01) |
| H04W 72/0446 | (2023.01) |
| H04W 72/0453 | (2023.01) |
| H04W 72/23 | (2023.01) |

(52) U.S. Cl.
CPC .......... *H04W 72/53* (2023.01); *H04L 5/1469* (2013.01); *H04W 72/0446* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2020/0052865 A1* | 2/2020 | Liou | H04W 72/1289 |
| 2020/0228196 A1 | 7/2020 | John Wilson et al. | |
| 2020/0359411 A1* | 11/2020 | Li | H04W 72/1273 |
| 2020/0374844 A1 | 11/2020 | Takeda et al. | |
| 2021/0243812 A1* | 8/2021 | Agiwal | H04W 74/0833 |
| 2022/0078728 A1* | 3/2022 | Yi | H04W 48/16 |

OTHER PUBLICATIONS

International Search Report and Written Opinion—PCT/US2022/027097—ISA/EPO—dated Aug. 5, 2022.

* cited by examiner

*Primary Examiner* — Zewdu A Beyen
(74) *Attorney, Agent, or Firm* — Patterson + Sheridan, LLP

(57) ABSTRACT

Aspects of the present disclosure relate to wireless communications, and more particularly, to techniques for updating a slot format during full duplex (FD) operation. An example method by a user equipment (UE) generally includes receiving signaling for the UE to operate on at least one active bandwidth part (BWP) and participating in FD communications in the at least one active BWP on at least some symbols, based on a first slot format associated with the at least one active BWP.

30 Claims, 12 Drawing Sheets

Use Case 1

Use Case 2

Use Case 3

700

| gNB | UE | Description |
| --- | --- | --- |
| Full Duplex Disabled | Full Duplex Disabled | Baseline Operation |
| Full Duplex Disabled | Full Duplex Enabled | Use Case 1 for mTRP |
| Full Duplex Enabled | Full Duplex Disabled | Use Case 2/ IAB |
| Full Duplex Enabled | Full Duplex Enabled | Use Case 3 |

FIG. 7

| BD | BD | BD | BD | BD | BD | BD | BD | BD | BD | BD | BD | BD | BD |
|----|----|----|----|----|----|----|----|----|----|----|----|----|----|
| BD | BD | BD | BD | BD | BD | BD | BD | F  | F  | F  | F  | F  | F  |
| D  | D  | D  | BD | BD | BD | BD | BD | BD | BD | BD | BD | BD | BD |

Example slot formats with a new symbol type BD symbols

RULES FOR UPDATING SLOT FORMAT SUPPORTING FULL DUPLEX OPERATION

TECHNICAL FIELD

Aspects of the present disclosure relate to wireless communications, and more particularly, to techniques for updating a slot format during full duplex (FD) operation.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes receiving signaling for the UE to switch to at least one active BWP; and participating in full duplex (FD) communications in the at least one active BWP on at least some symbols, based on a first slot format associated with the at least one active BWP.

Certain aspects of the present disclosure provide an apparatus for wireless communications by a UE. The apparatus generally includes an interface configured to obtain signaling for the UE to switch to at least one active BWP, and a processing system configured to participate in FD communications in the at least one active BWP on at least some symbols, based on a first slot format associated with the at least one active BWP.

Certain aspects of the present disclosure provide a UE. The UE generally includes means for receiving signaling for the UE to switch to at least one active BWP, and means for participating in FD communications in the at least one active BWP on at least some symbols, based on a first slot format associated with the at least one active BWP.

Certain aspects of the present disclosure provide a computer readable medium for wireless communications. The computer readable medium includes instructions or codes being executable by an apparatus to obtain signaling for a UE to switch to at least one active BWP and participate in FD communications in the at least one active BWP on at least some symbols, based on a first slot format associated with the at least one active BWP.

Certain aspects of the present disclosure provide a method for wireless communications by a network entity. The method generally includes transmitting, to a UE, an indication for the UE to switch to at least one active BWP; and participating in FD communications with the UE in the at least one active BWP on at least some symbols, based on a first slot format associated with the at least one active BWP.

Certain aspects of the present disclosure provide an apparatus for wireless communication by a network entity. The apparatus generally includes an interface configured to output, for transmission to a UE, an indication for the UE to switch to at least one active BWP, and a processing system configured to participate in FD communications with the UE in the at least one active BWP on at least some symbols, based on a first slot format associated with the at least one active BWP.

Certain aspects of the present disclosure provide a network entity. The network entity generally includes means for transmitting, to a UE, an indication for the UE to switch to at least one active BWP, and means for participating in FD communications with the UE in the at least one active BWP on at least some symbols, based on a first slot format associated with the at least one active BWP.

Certain aspects of the present disclosure provide a computer readable medium for wireless communications. The computer readable medium includes codes or instructions executable by an apparatus to output, for transmission to a UE, an indication for the UE to switch to at least one active BWP, and participate in FD communications with the UE in the at least one active BWP on at least some symbols, based on a first slot format associated with the at least one active BWP.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 summarizes the use cases shown in FIGS. 4-6.

FIG. 11 illustrates example slot formats with a bi-directional symbol type, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
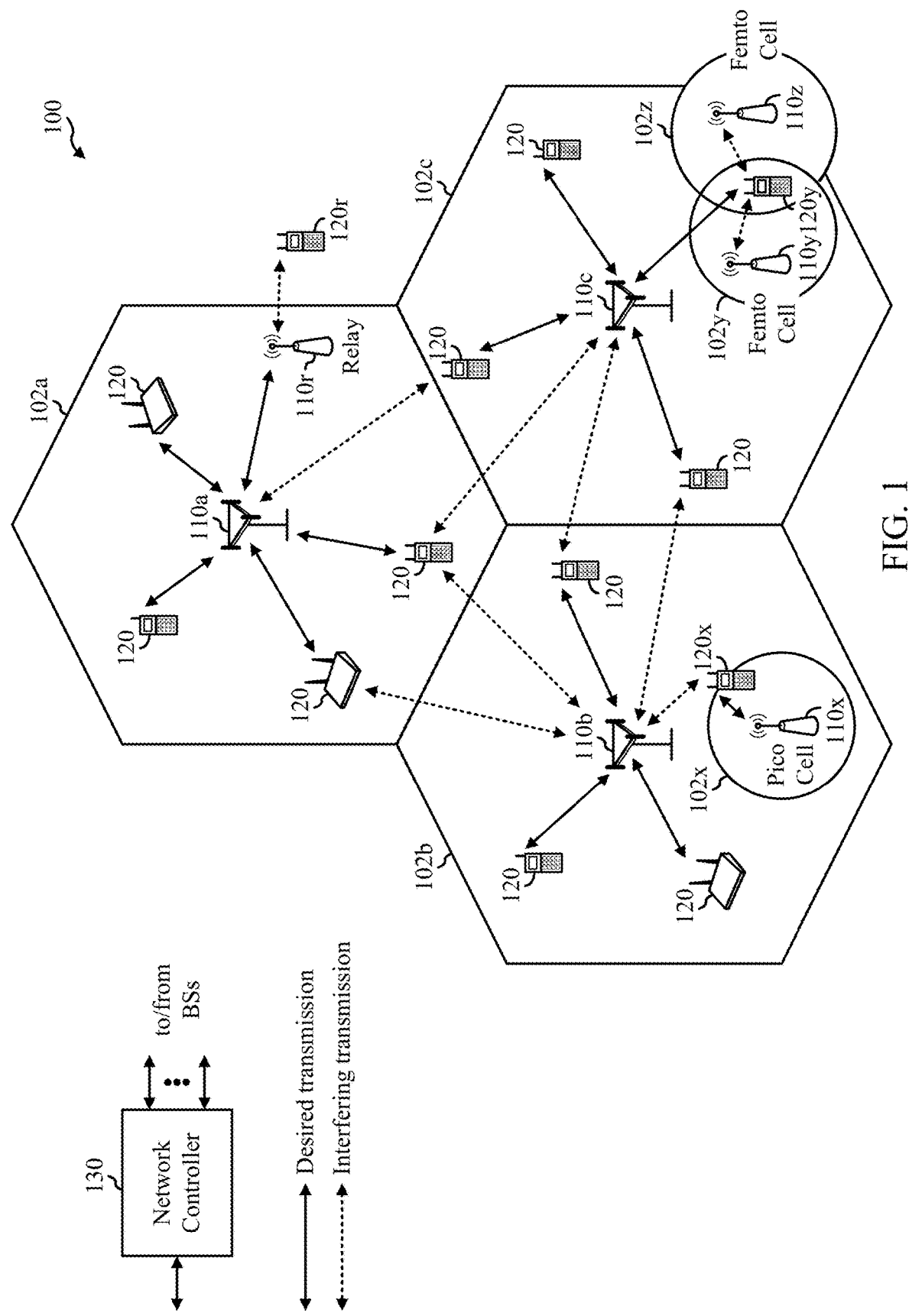
FIG. 1 is a block diagram conceptually illustrating an example telecommunications system, in accordance with certain aspects of the present disclosure.

Aspects of the present disclosure relate to wireless communications, and more particularly, to techniques that effectively provide a set of rules for updating slot formats to support full duplex (FD) operation. For example, the slot formats may have one or more symbols that support bi-directional communications.

In some cases, uplink and downlink bandwidth parts (BWPs) may be paired and have corresponding slot formats that support FD operation. For example, the uplink BWP may have a slot format with one or more uplink symbols that correspond to downlink symbols of the downlink BWP slot format.

In some cases, updated slot formats that support FD operation may override at least certain symbols of radio resource control (RRC) configured time division duplex (TDD) common slot formats.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 900 of FIG. 9 to update a slot format during full duplex (FD) operation. Similarly, the wireless network 100 may include a BS 110 configured to perform operations 1000 of FIG. 10 to participate in FD communications with a UE (performing operations 900 of FIG. 9).

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a UE or a BS may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
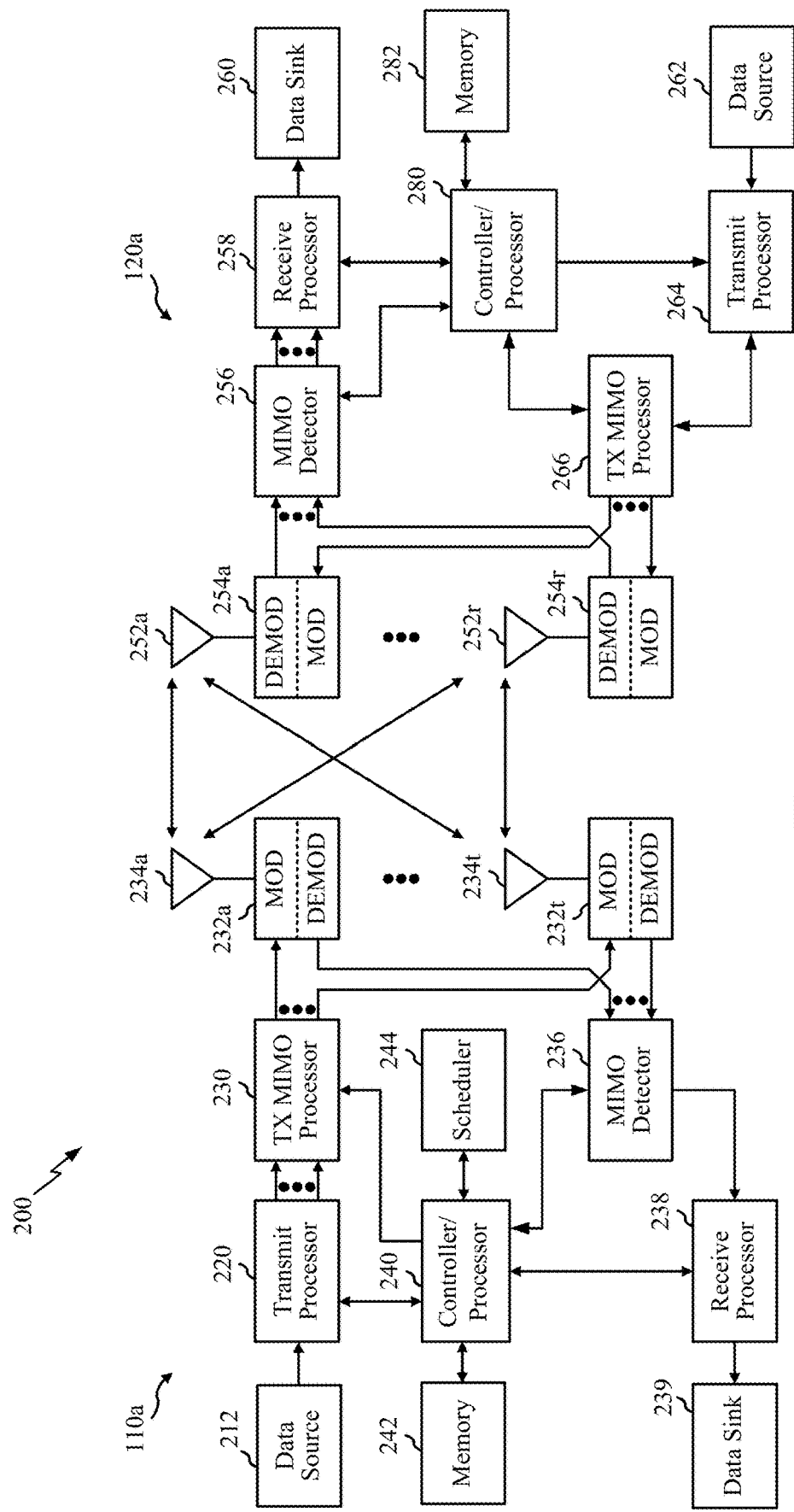
FIG. 2 is a block diagram conceptually illustrating a design of an example base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, controller/processor 280 and/or other processors and modules at the UE 120*a* may perform (or be used by UE 120*a* to perform) operations 900 of FIG. 9. Similarly, the controller/processor 240 and/or other processors and modules at the BS 110*a* may perform or direct the execution of processes for the techniques described herein. For example, controller/processor 240 and/or other processors and modules at the BS 110*a* may perform (or be used by BS 121*a* to perform) operations 1000 of FIG. 10. Although shown at the controller/processor, other components of the UE 120*a* or BS 110*a* may be used to perform the operations described herein.

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
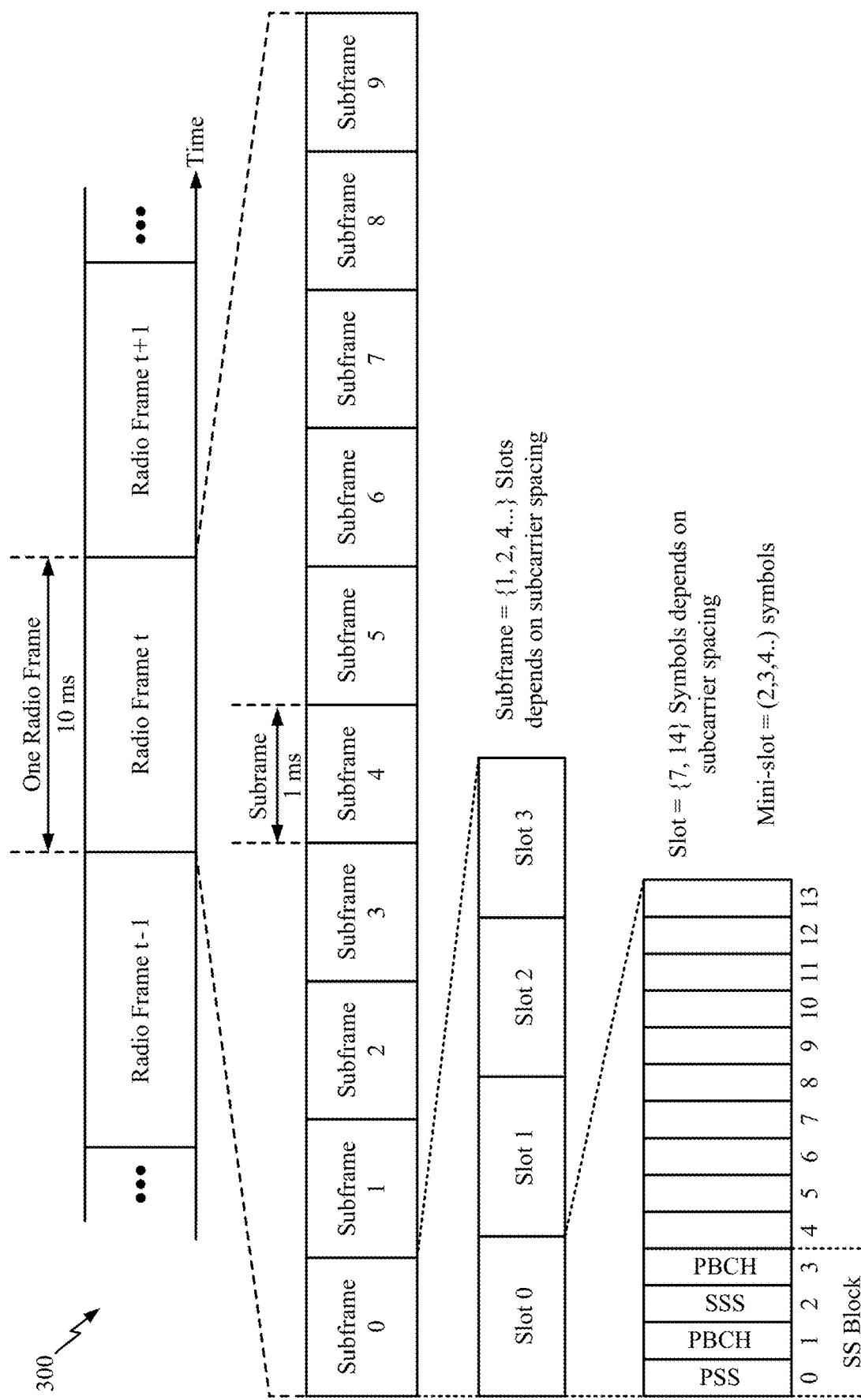
FIG. 3 illustrates an example of a frame format for a new radio (NR) system, in accordance with certain aspects of the present disclosure.

FIG. 3 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Example Full Duplex Use Cases

Aspects of the present disclosure relate to wireless communications, and more particularly, to techniques that effectively provide a set of rules for updating slot formats to support full duplex (FD) operation. For example, the slot formats may have one or more symbols that support bi-directional communications.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. In some cases, a frequency band referred to as FR2x may be used.

There are various motivations for utilizing full duplex (FD) communications, for example, for simultaneous UL/DL transmissions in FR2. In some cases, FD capability may enable flexible time division duplexing (TDD) capability and may be present at either the gNB or UE or both. As an example, at the UE, UL transmissions may be sent from one antenna panel (of multiple antenna panels) and DL reception may be performed at another antenna panel. As another example, at the gNB, UL transmissions can be from one panel and DL reception in another panel.

Flexible TTD capability may be conditional on beam separation (e.g., the ability to find transmitter/receiver (Tx/Rx) beam pairs that achieve sufficient separation). Flexible TDD capability may mean, for example, that a UE or base station is able to use Frequency Division Duplex (FDD) on slots conventionally reserved for uplink-only or downlink-only slots (or flexible slots that may be dynamically indicated as either uplink or downlink). Thus, potential benefits of full duplex communications include latency reduction (e.g., it may be possible to receive DL signals in what would conventionally be considered UL only slots, which can enable latency savings), spectrum efficiency enhancements (per cell and/or per UE), and overall more efficient resource utilization.

Figure 4:
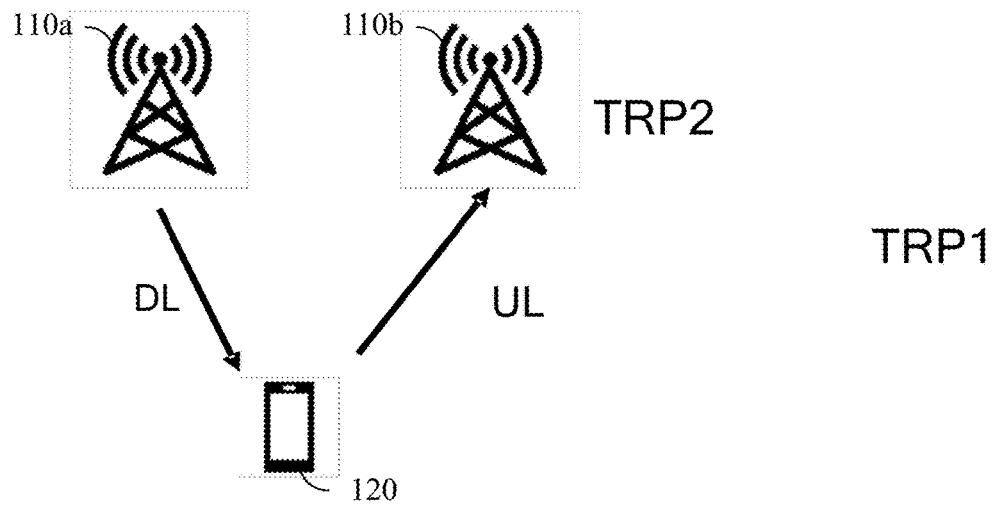
FIG. 4-6 illustrate different use cases for full-duplex communications, in which aspects of the present disclosure may be utilized.
Figure 5:
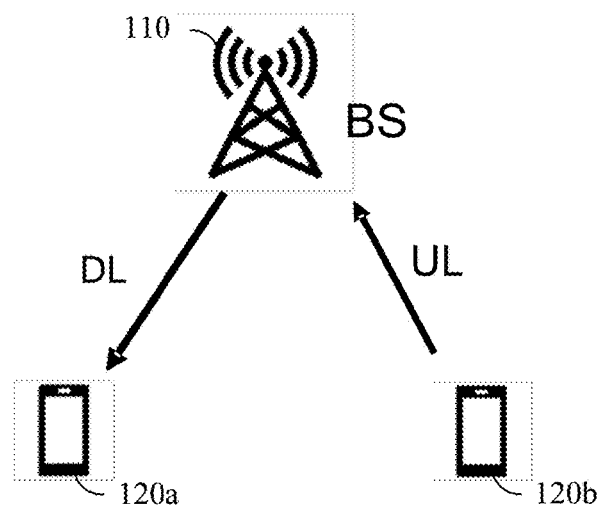
Figure 6:
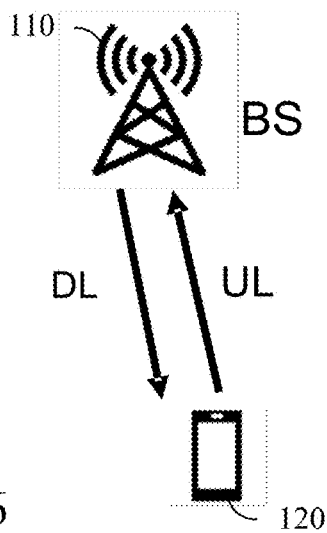

FIGS. 4, 5, and 6 illustrated example use cases for FD communications. FIG. 7 summarizes certain possible features of these use cases.

As illustrated in FIG. 4, for a first use case (Use Case 1), one UE 120 may simultaneously communicate with a first transmitter receiver point (TRP 1) 110a on the downlink, while transmitting to a second TRP 110b on the uplink. For this use case, flexible TDD may be disabled at the gNB (TRP) and enabled at the UE.

As illustrated in FIG. 5, for a second use case (Use Case 2), one BS 110 may simultaneously communicate with a first UE (UE 1 120a) on the downlink, while communicating with a second UE (UE 2 120b) on the uplink. For this use case, flexible TDD may be enabled at the BS (e.g., gNB) and disabled at the UE. Use cases with flexible TDD enabled at the gNB and disabled at the UE may be suitable for integrated access and backhaul (IAB) applications as well.

As illustrated in FIG. 6, for a third use case (Use Case 3), a UE 120 may simultaneously communicate with a base station 110, transmitting on the uplink while receiving on the downlink. For this use case, flexible TDD may be enabled at both the base station/gNB and the UE.

Figure 8:
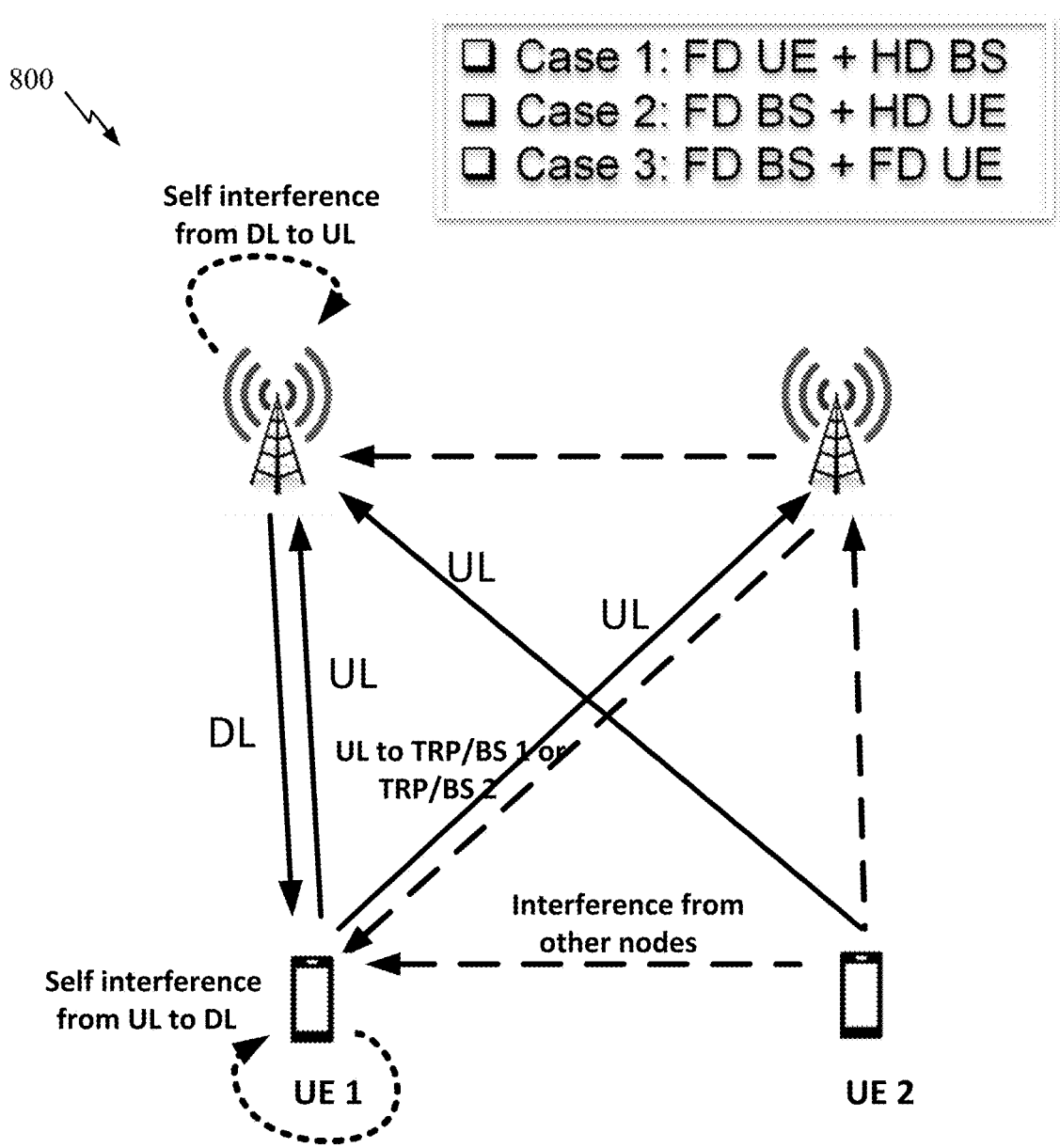
FIG. 8 illustrates an example deployment of multiple UEs and multiple BSs, in accordance with certain aspects of the present disclosure.

As illustrated in FIG. 8, interference to a UE and gNB operating in FD mode could come in the form of interference from other nodes, as well as self-interference. In some cases, self-interference measurement (SIM) at a UE may be needed to enable full duplex transmissions. For example, self-interference measurements may be used to select transmit and receive beam pairs that achieve suitable beam separation. Suitable beam separation of a transmit and receive beam pair may be indicated, for example, by relatively low self-interference measurements taken on one panel (using the receive beam) while transmitting uplink reference signals with another panel (using the transmit beam). Thus, during a SIM procedure, the UE may transmit reference signals on the uplink using a first antenna panel, while measuring the reference signals (on the downlink) with a second antenna panel.

Example Rules for Updating Slot Format Supporting Full Duplex Operation

Aspects of the present disclosure relate to wireless communications, and more particularly, to techniques that effectively provide a set of rules for updating slot formats to support full duplex (FD) operation. For example, when a UE is configured to operate on an active bandwidth part (BWP), that BWP may have an associated slot format with one or more symbols that support FD communications. As will be described in greater detail below, the UE may implicitly update the slot format upon switching to such a BWP or the slot format may be explicitly indicated.

Figure 9:
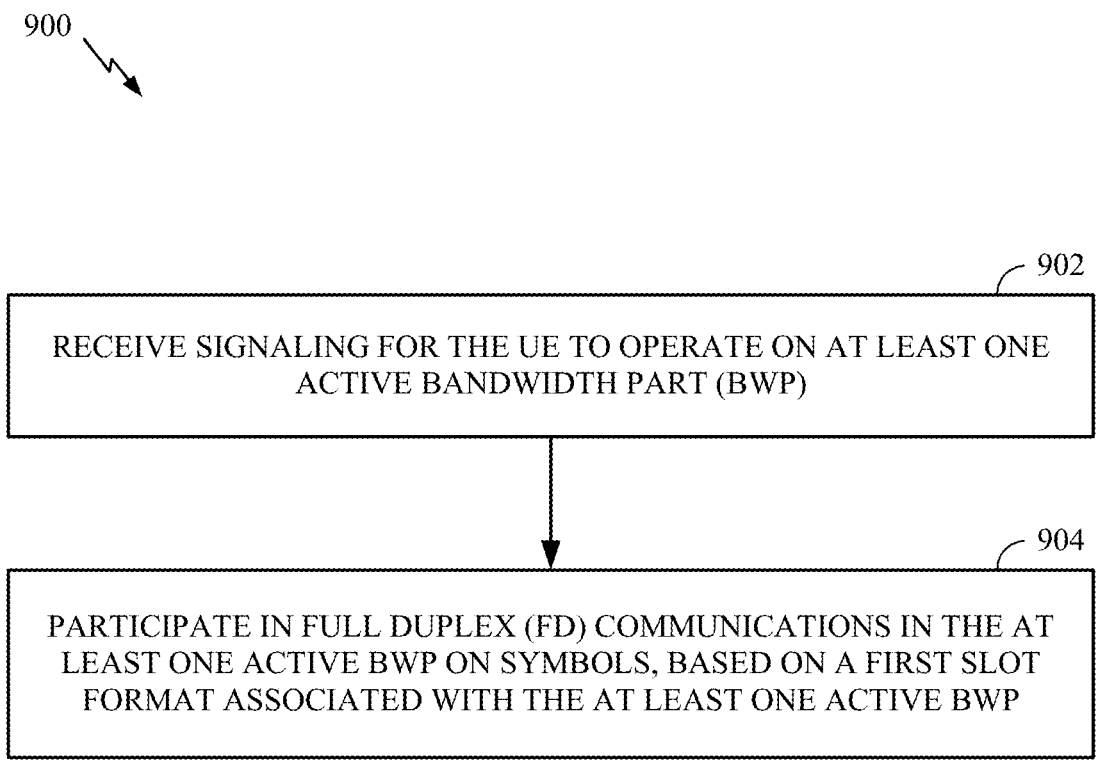
FIG. 9 illustrates example operations for wireless communications by a user equipment (UE), in accordance with certain aspects of the present disclosure.
Figure 10:
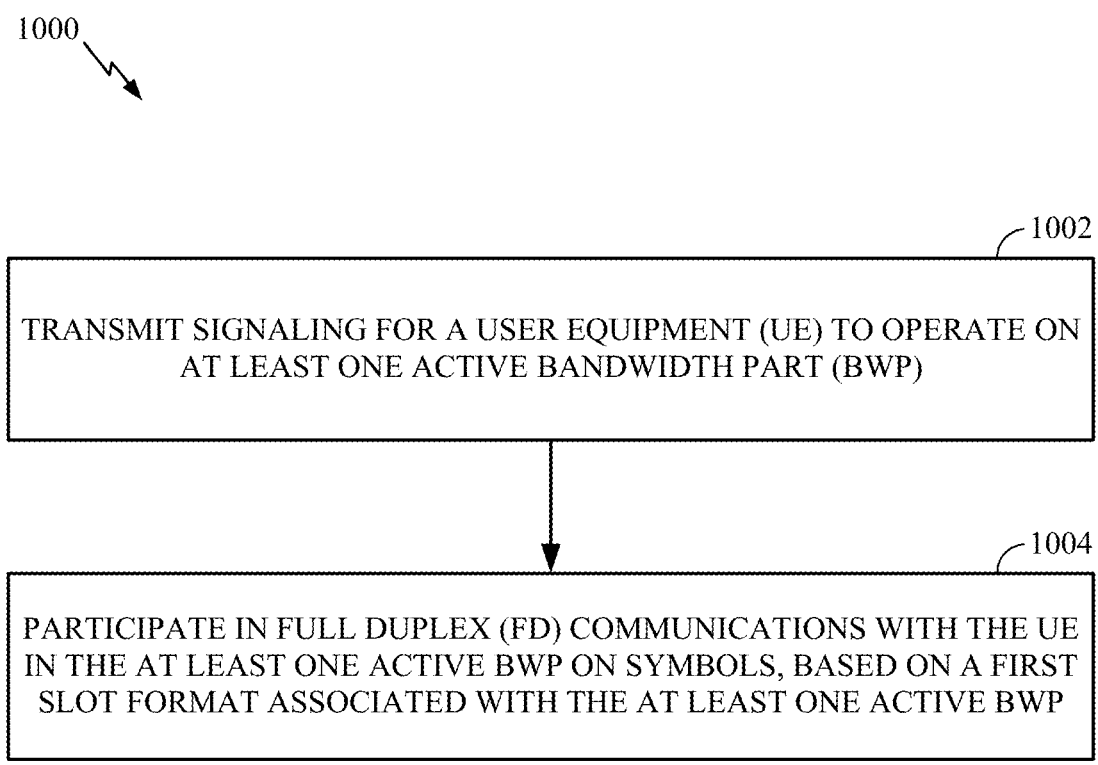
FIG. 10 illustrates example operations for wireless communications by a network entity, in accordance with certain aspects of the present disclosure.

FIGS. 9 and 10 illustrate example operations that may be performed by a UE and network entity, respectively, for updating a slot format during FD operation.

FIG. 9 illustrates example operations 900 for wireless communications by a UE, in accordance with certain aspects of the present disclosure. For example, operations 900 may be performed by a UE 120 of FIG. 1 for FD communications.

Operations 900 begin, at 902, by receiving signaling for the UE to operate on at least one active bandwidth part (BWP). For example, the signaling could be signaling for the UE to switch to an active BWP that supports FD communications.

At 904, the UE participates in FD communications in the at least one active BWP on at least some symbols, based on a first slot format associated with the at least one active BWP. In some cases, the UE may implicitly update the slot format upon switching to a BWP that supports FD communications. In other cases, an updated slot format may be explicitly indicated to the UE.

FIG. 10 illustrates example operations 1000 for wireless communications by a network entity and may be considered complementary to operations 1000 of FIG. 10. For example, operations 1000 may be performed by a gNB for FD communications with a UE (performing operations 900 of FIG. 9).

Operations 1000 begin, at 1002, by transmitting signaling for a user equipment (UE) to operate on at least one active bandwidth part (BWP). At 1004, the network entity participates in full duplex (FD) communications with the UE in the at least one active BWP on symbols, based on a first slot format associated with the at least one active BWP.

As noted above, various rules may be provided for implicitly updating slot formats to support FD operation. As an example, a UE operating in HD or FD mode may switch to a new active BWP. This BWP may be preconfigured with an associated slot format pattern (e.g., that defines symbols as uplink, downlink, flexible, and/or bi-directional). In such cases, the slot format may be implicitly updated (at the UE and gNB) with the BWP switch.

This may understood considering the following examples of BWP combinations preconfigured with slot format patterns that support FD operation. A combination of DL BWP 1 and UL BWP 1 for FD operation may be associated with a preconfigured slot format pattern 1 for FD operation. A combination of DL BWP 2 and UL BWP 2 for HD operation may be associated with a preconfigured slot format pattern 2 for HD operation. A combination of DL BWP 3 and UL BWP 3 for HD operation may be associated with a preconfigured slot format pattern 3 for FD operation. A combination of DL BWP 4 and UL BWP 4 for FD operation may be associated with a preconfigured slot format pattern 4 for HD operation.

Other than downlink (D), uplink (U), and flexible (F), slot format patterns for FD operation may define a new symbol type as a Bi-Directional (BD) FD symbol. Thus, slot format patterns including the new BD FD symbols may be defined for FD operation mode. FIG. 11 illustrates example slot formats with a bi-directional (BD) symbol type, in accordance with certain aspects of the present disclosure.

In some cases, a slot format indicator (SFI) index may be associated with a BWP or defined tdd-UL-DL-ConfigurationDedicated patterns may be defined, with indices and associate that with BWP. In this manner, a conventional SFI-index (defined for paired spectrum) may be reused in FD mode.

In general, a BWP pair (DL BWP i and UL BWP j) may be paired and configured for FD transmissions with a guard band X in between. In some cases, the network may send downlink control information (DCI) to dynamically switch/indicate the BWP index and its corresponding slot format pattern and FD/HD operation mode. This approach may save signaling overhead, for example, eliminating the need to configure tdd-UL-DL-ConfigurationCommon or tdd-UL-DL-ConfigurationDedicated for each BWP or BWP pair that supports FD operation. In some cases, a BWP information element (IE) may add a preconfigured slot format field (to indicate a slot format the supports FD operation) in that BWP IE.

There are various options for explicitly updating slot formats to support FD operation. For example, one option is to reuse existing BWP configurations for unpaired spectrum operation. For example, existing BWP configurations could be used to configure a pair of DL/UL BWPs (fully/partially/non overlapping BWPs). In some cases, for unpaired spectrum operation, a DL BWP from the set of configured DL BWPs with an index provided by BWP-Id may be linked with an UL BWP from the set of configured UL BWPs with an index provided by BWP-Id when the DL BWP index and the UL BWP index are same.

As an Alternative, a new BWP configuration may be defined that includes both DL and UL configurations for FD operation with corresponding configuration parameters.

For example, radio resource control (RRC) signaling could configure a common slot format via tdd-UL-DL-ConfigurationCommon supporting FD symbols. According to one option, for flexible (F) symbols, a new rule could be added that bi-directional transmissions could happen in F.

As another option, in addition to D, U, and F, symbols, a new symbol type may be defined as a Bi-Directional (BD) FD symbol. Certain slot format patterns may be defined (redefined) including the new BD FD symbols. For example, with the new BD FD symbol, the configuration and corresponding rules of tdd-UL-DL-ConfigurationCommon (e.g., that dictate slot configuration, periodicity, and location of different symbol types based on subcarrier spacing-SCS) may be modified to define new patterns. Examples of such patterns may be (or portions thereof) could be:

```
D ... F ... BD ... U ...
D ... BD ... F ... U ...
D ... BD ... F ... BD ... U ...
D ... BD ... U ...
D ... U ... BD ...
FD ... D ... U ...
D ... F ... BD ...
F ... BD ...
BD ... F ...
BD ...
```

According to another option, RRC signaling could configure a dedicated slot format via a tdd-UL-DL-ConfigurationDedicated supporting FD symbols. For example, a rule could be defined that allows symbols defined in tdd-UL-DL-ConfigurationDedicated, if additionally provided to a UE, to override F symbols, provided by tdd-UL-DLConfigurationCommon, to be D, U, or BD FD symbols.

As another example, such a rule could be expanded such that the parameter tdd-UL-DL-ConfigurationDedicated could not only override F symbols per slot (provided by tdd-UL-DLConfigurationCommon) but also other symbols.

Figure 12A:
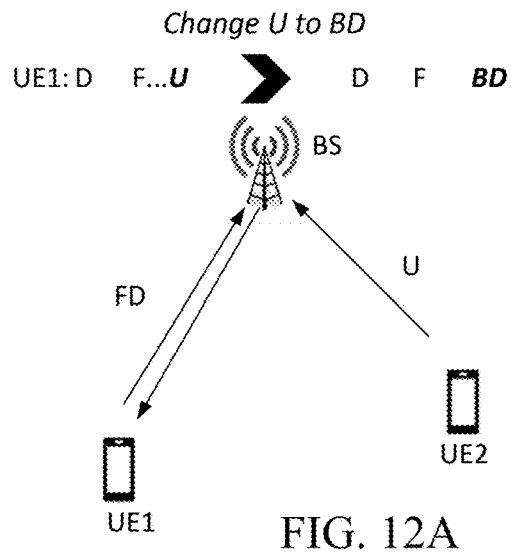
FIGS. 12A-12C illustrate different use cases for full-duplex communications using one or more rules, in which aspects of the present disclosure may be utilized.
Figure 12B:
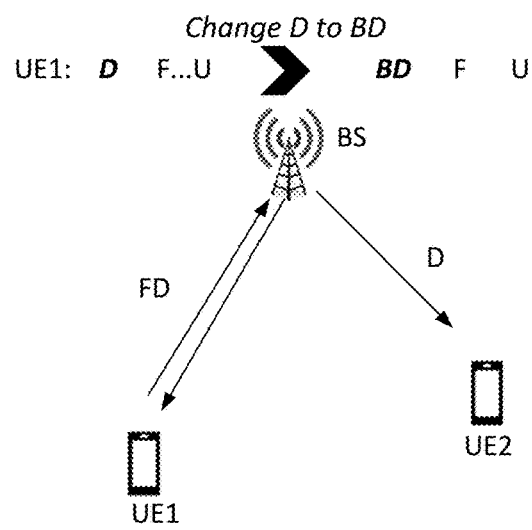

According to certain aspects, this could be implemented as an FD configuration rule in tdd-UL-DL-ConfigurationDedicated. For example, in the examples shown in FIGS. 12A and 12B, based on the UE FD capability and scheduling, the BS (e.g., gNB) may override D or U or F symbol to BD FD symbol for a UE (e.g., UE 1 in the illustrated examples) or a group of UEs.

Figure 12C:
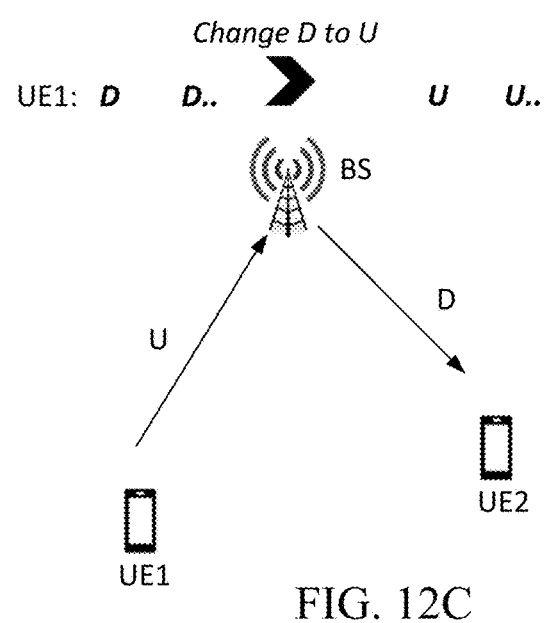

According to certain aspects, this could be implemented as a D/U configuration rule in tdd-UL-DL-ConfigurationDedicated. For example, with a BS supporting FD mode, as in the example shown in FIG. 12C, the BS may override one or more D symbols to U symbols for a particular UE (e.g., UE 1 in the illustrated example) or a group of UEs.

According to certain aspects, a DCI (DCI group common format 2_0 or other UE specific DCI format) may configure a dedicated slot format via SFI-index supporting FD symbols. For example, different values of SFI-index could be used to select different example (dedicated FD) slot formats shown in FIG. 11.

In such cases, a rule could be defined that allows symbols defined in a dedicated slot format indicated via SFI-index to override F symbols, provided by tdd-UL-DLConfigurationCommon, to be D, U, or BD FD symbols.

As another example, such a rule could be expanded to allow symbols defined in a dedicated slot format indicated via SFI-index to not only override F symbols per slot (provided by tdd-UL-DLConfigurationCommon) but also other symbols.

According to certain aspects, this could be implemented as an FD configuration rule in SFI-index, similar to the examples described above with reference to FIGS. 12A and 12B. According to certain aspects, this could be implemented as a D/U configuration rule in SFI-index similar to the example described above with reference to FIG. 12C.

According to certain aspects, a DCI (DCI group common format 2_0 or other UE specific DCI format) could configure a dedicated slot format via an SFI-index supporting FD symbols.

For example, in some cases, an existing FDD SFI-index indication could be reused, where in FDD, the SFI-index indicates a combination of slot formats for both DL BWP and UL BWP. For FD operation, this SFI-index may be used to indicate both DL and UL BWPs, where the DL BWP and UL BWP may be in different frequency bands or partially overlapped frequency bands or the same frequency band.

In such cases, an additional rule may be defined to support HD mode via FDD SFI-index. For example, the rule may dictate that, to pair with a D symbol, an UL FDD symbol may have to be an F symbol, so the UE does not expect UL transmission on the F symbol overlapping with the D symbol to support HD mode operation. Similarly, to pair with a U symbol, a DL FDD symbol may have to be an F symbol, such that the UE does not expect DL reception on the F symbol overlapping with the U symbol to support HD mode operation.

For FD operation, there are various options. For example, one option is to use D and U symbols for FD operation, which can support semi-persistent (SP) and dynamic transmissions. Another option is to use DL/UL F symbols for FD operation scheduled on F symbols, which can support dynamic transmissions.

Example Communications Devices

Figure 13:
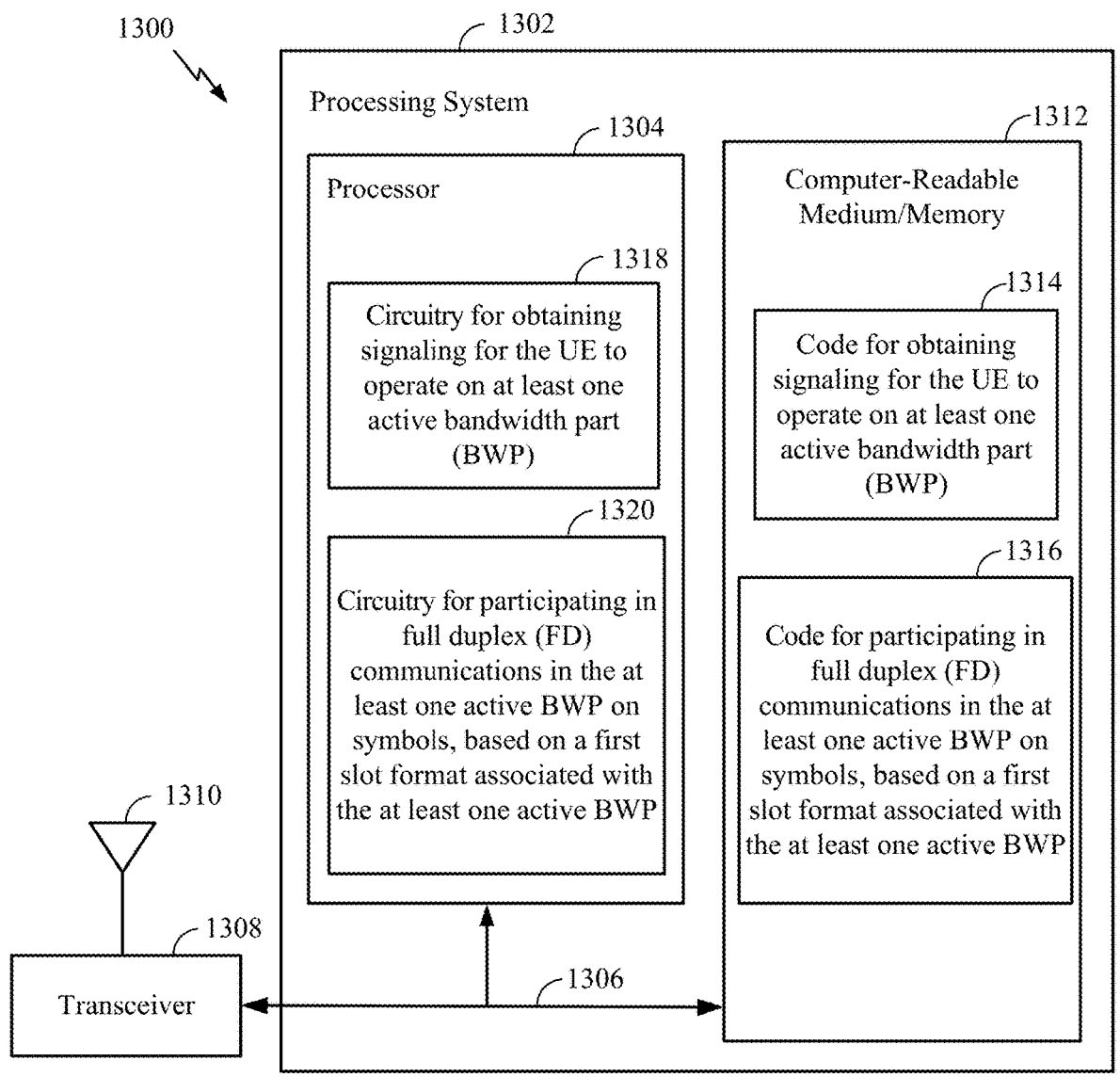
FIGS. 13 and 14 illustrate devices capable of performing the operations described herein, in accordance with certain aspects of the present disclosure.

FIG. 13 illustrates a communications device 1300 (e.g., a UE) that may include various components (e.g., corresponding to means-plus-function components) configured to perform operations for the techniques disclosed herein, such as the operations illustrated in FIG. 9. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein. In certain aspects, computer-readable medium/memory 1312 stores code 1314 for obtaining signaling for the UE to operate on at least one active bandwidth part (BWP); and code 1316 for participating in full duplex (FD) communications in the at least one active BWP on symbols, based on a first slot format associated with the at least one active BWP. In certain aspects, the processor 1304 has circuitry configured to implement the code stored in the computer-readable medium/memory 1312. The processor 1304 includes circuitry 1318 for obtaining signaling for the UE to operate on at least one active bandwidth part (BWP); and circuitry 1320 for participating in full duplex (FD) communications in the at least one active BWP on symbols, based on a first slot format associated with the at least one active BWP.

Figure 14:
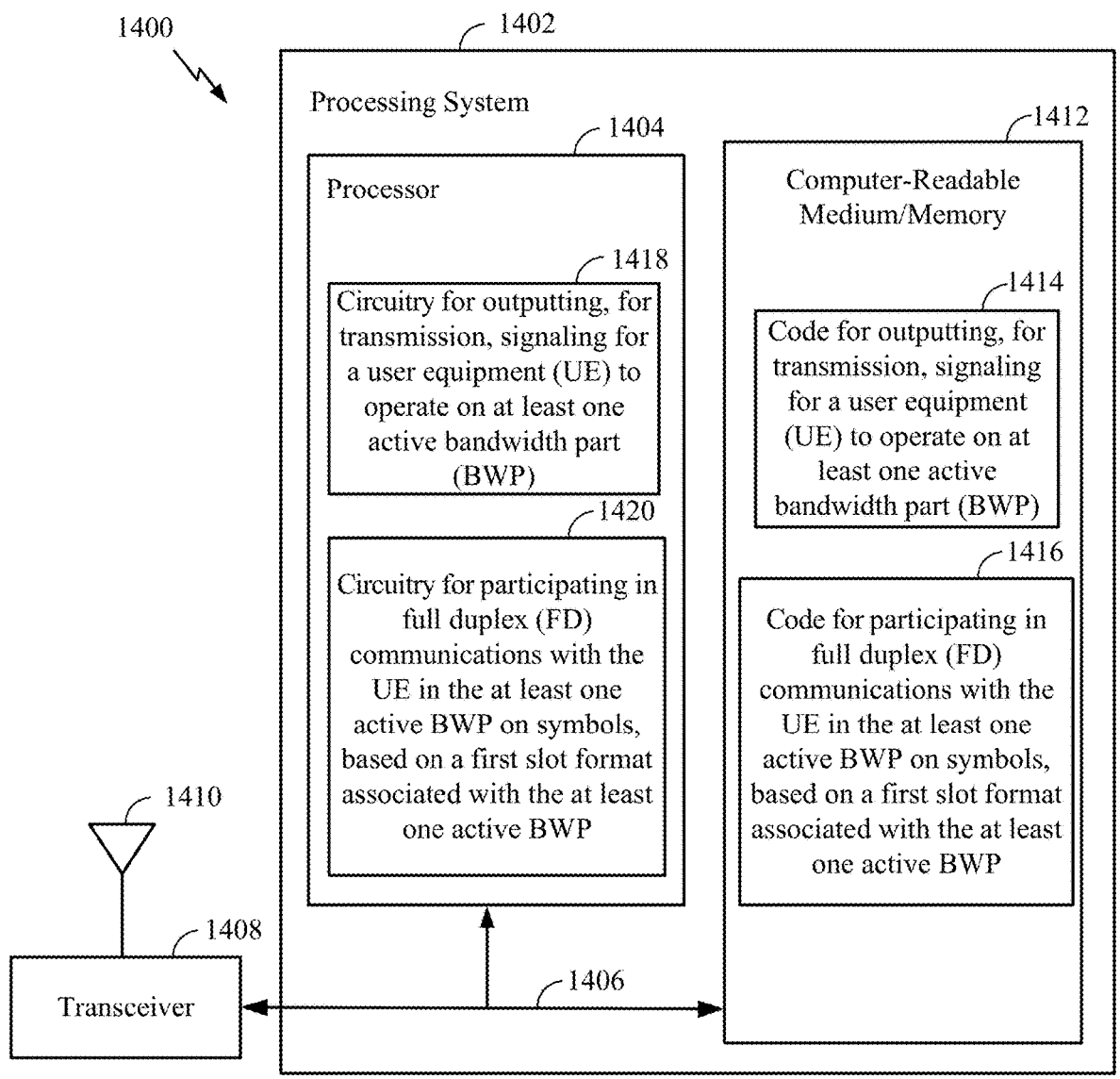

FIG. 14 illustrates a communications device 1400 (e.g., a network entity such as a gNB) that may include various components (e.g., corresponding to means-plus-function components) configured to perform operations for the techniques disclosed herein, such as the operations illustrated in FIG. 10. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 10, or other operations for performing the various techniques discussed herein. In certain aspects, computer-readable medium/memory 1412 stores code 1414 for outputting, for transmission, signaling for a user equipment (UE) to operate on at least one active bandwidth part (BWP); and code 1416 for participating in full duplex (FD) communications with the UE in the at least one active BWP on symbols, based on a first slot format associated with the at least one active BWP. In certain aspects, the processor 1404 has circuitry configured to implement the code stored in the computer-readable medium/memory 1412. The processor 1404 includes circuitry 1418 for outputting, for transmission, signaling for a user equipment (UE) to operate on at least one active bandwidth part (BWP); and circuitry 1420 for participating in full duplex (FD) communications with the UE in the at least one active BWP on symbols, based on a first slot format associated with the at least one active BWP.

Example Aspects

Implementation examples are described in the following numbered aspects:

Aspect 1: A method for wireless communications performed by a user-equipment (UE), comprising: receiving signaling for the UE to operate on at least one active bandwidth part (BWP); and participating in full duplex (FD) communications in the at least one active BWP on symbols, based on a first slot format associated with the at least one active BWP.

Aspect 2: The method of Aspect 1, wherein the first slot format defines one or more symbols of a bi-directional FD symbol type.

Aspect 3: The method of any one of Aspects 1-2, wherein: the signaling indicates the UE is to switch to the at least one active BWP; and the method further comprises switching to the first slot format based on the switch to the at least one active BWP.

Aspect 4: The method of any one of Aspects 1-3, wherein different uplink and downlink BWP pairs are defined with different slot formats, at least some of which support the FD communications.

Aspect 5: The method of Aspect 4, wherein uplink and downlink BWPs of one of the BWP pairs defined with a slot format that supports the FD communications are separated by a guard band, or partially overlapped or fully overlapped.

Aspect 6: The method of any one of Aspects 1-5, wherein the signaling comprises a downlink control information (DCI) that signals the UE to dynamically switch to the at least one active BWP and its corresponding slot format.

Aspect 7: The method of Aspect 4, wherein the defined slot format of the one BWP is indicated via a defined slot format field in a BWP information element.

Aspect 8: The method of Aspect 4, wherein the defined slot format of the one BWP is indicated via a BWP configuration that can configure a pair of uplink and downlink BWPs, and further wherein a DL BWP is linked with an UL BWP.

Aspect 9: The method of Aspect 4, wherein the defined slot format of the one BWP is indicated via: a BWP configuration that configures a pair of uplink and downlink BWPs; or a BWP configuration including both downlink and uplink configurations for the FD communications and corresponding configuration parameters.

Aspect 10: The method of any one of Aspects 1-9, further comprising receiving radio resource control (RRC) signaling indicating the first slot format as a common slot format.

Aspect 11: The method of any one of Aspects 1-10, wherein the first slot format has flexible symbols that support bi-directional transmissions.

Aspect 12: The method of any one of Aspects 1-11, wherein the first slot format defines one or more symbols of a bi-directional FD symbol type.

Aspect 13: The method of any one of Aspects 1-12, further comprising receiving: radio resource control (RRC) signaling indicating the first slot format as a UE-specific slot format; or a downlink control information that configures the first slot format via a slot format indicator (SFI) index supporting FD symbols.

Aspect 14: The method of any one of Aspects 1-13, wherein: the first slot format defines one or more symbols of a bi-directional FD symbol type; and the one or more symbols of bi-direction FD symbol type override flexible symbols defined by a common slot format.

Aspect 15: The method of Aspect 14, wherein: the one or more symbols of bi-direction FD symbol type also override at least one of uplink or downlink symbols defined by the common slot format.

Aspect 16: The method of any one of Aspects 1-15, wherein, for FD operation, at least one of: one or more downlink symbols override one or more uplink symbols defined by a common slot format; or one or more uplink symbols override one or more downlink symbols defined by a common slot format Aspect 17: The method of Aspect 13, wherein the SFI index indicates a combination of slot formats for a downlink BWP and an uplink BWP.

Aspect 18: The method of Aspect 17, wherein the downlink BWP and uplink BWP are in different frequency bands, partially overlapped frequency bands, or the same frequency band.

Aspect 19: The method of Aspect 17, wherein the slot formats indicated by the SFI index define downlink symbols associated with a downlink BWP and uplink symbols associated with an uplink BWP that support semi-persistent and dynamic transmissions.

Aspect 20: The method of Aspect 17, wherein the slot formats indicated by the SFI index define flexible symbols for FD operation that support dynamic transmissions.

Aspect 21: A method for wireless communications performed by a network entity, comprising: transmitting signaling for a user equipment (UE) to operate on at least one active bandwidth part (BWP); and participating in full duplex (FD) communications with the UE in the at least one active BWP on symbols, based on a first slot format associated with the at least one active BWP.

Aspect 22: The method of Aspect 21, wherein the first slot format defines one or more symbols of a bi-directional FD symbol type.

Aspect 23: The method of any one of Aspects 21-22, wherein: the signaling indicates the UE is to switch to the at least one active BWP; and the method further comprises switching to the first slot format based on the switch to the at least one active BWP.

Aspect 24: The method of any one of Aspects 21-23, wherein different uplink and downlink BWP pairs are defined with different slot formats, at least some of which support the FD communications.

Aspect 25: The method of any one of Aspects 21-24, wherein the signaling comprises a downlink control information (DCI) that signals the UE to dynamically switch to the at least one active BWP and its corresponding slot format.

Aspect 26: The method of any one of Aspects 21-25, further comprising receiving radio resource control (RRC) signaling indicating the first slot format as a common slot format.

Aspect 27: The method of any one of Aspects 21-26, further comprising receiving: radio resource control (RRC) signaling indicating the first slot format as a UE-specific slot format; or a downlink control information that configures the first slot format via a slot format indicator (SFI) index supporting FD symbols.

Aspect 28: The method of any one of Aspects 21-27, wherein: the first slot format defines one or more symbols of a bi-directional FD symbol type; and the one or more symbols of bi-direction FD symbol type override flexible symbols defined by a common slot format.

Aspect 29: A user equipment, comprising means for performing the operations of one or more of Aspects 1-20.

Aspect 30: A user equipment, comprising a transceiver and a processing system including at least one processor configured to perform the operations of one or more of Aspects 1-20.

Aspect 31: An apparatus for wireless communication performed by a user-equipment (UE), comprising: an interface configured to obtain signaling for the UE to switch to at least one active bandwidth part (BWP); and a processing system configured to participate in full duplex (FD) communications in the at least one active BWP on at least some symbols, based on a first slot format associated with the at least one active BWP.

Aspect 32: A computer-readable medium for wireless communications, comprising codes executable by an apparatus to: obtain signaling for the UE to switch to at least one active bandwidth part (BWP); and participate in full duplex (FD) communications in the at least one active BWP on at least some symbols, based on a first slot format associated with the at least one active BWP.

Aspect 33: A network entity, comprising means for performing the operations of one or more of Aspects 21-28.

Aspect 34: A network entity, comprising a transceiver and a processing system including at least one processor configured to perform the operations of one or more of Aspects 21-28.

Aspect 35: An apparatus for wireless communication performed by a network entity, comprising: an interface configured to output, for transmission, signaling for a user equipment (UE) to operate on at least one active bandwidth part (BWP); and a processing system configured to participate in full duplex (FD) communications with the UE in the at least one active BWP on symbols, based on a first slot format associated with the at least one active BWP.

Aspect 36: A computer-readable medium for wireless communications, comprising codes executable by an apparatus to: output, for transmission, signaling for a user equipment (UE) to operate on at least one active bandwidth part (BWP); and participate in full duplex (FD) communications with the UE in the at least one active BWP on symbols, based on a first slot format associated with the at least one active BWP.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors controller/processor 280 of the UE 120a may be configured to perform operations 900 of FIG. 9, while controller/processor 240 of the BS 110a shown in FIG. 2 may be configured to perform operations 1000 of FIG. 10.

Means for receiving may include a receiver (such as one or more antennas or receive processors) illustrated in FIG. 2. Means for transmitting may include a transmitter (such as one or more antennas or transmit processors) illustrated in FIG. 2. Means for participating, means for switching, and means for performing may include a processing system, which may include one or more processors of the UE 120a and/or one or more processors of the BS 110a shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user-equipment (UE), comprising:
receiving signaling for the UE to operate on at least one active bandwidth part (BWP) having a first slot format, wherein the at least one active BWP is part of a BWP pair consisting of an uplink BWP and a downlink BWP, and wherein the first slot format is different from a slot format prior to the switch; and
participating in full duplex (FD) communications in the at least one active BWP on symbols, based on the first slot format associated with the at least one active BWP.

2. The method of claim 1, wherein the first slot format defines one or more symbols of a bi-directional FD symbol type.

3. The method of claim 1, wherein:
the method further comprises switching to the first slot format based on the at least one active BWP.

4. The method of claim 1, wherein different uplink and downlink BWP pairs are defined with different slot formats, at least some of which support the FD communications.

5. The method of claim 4, wherein uplink and downlink BWPs of one of the BWP pairs defined with a slot format that supports the FD communications are separated by a guard band, or partially overlapped or fully overlapped.

6. The method of claim 1, wherein the signaling comprises a downlink control information (DCI) that signals the UE to dynamically switch to the at least one active BWP and its corresponding first slot format.

7. The method of claim 4, wherein the defined slot format of the one BWP is indicated via a defined slot format field in a BWP information element.

8. The method of claim 4, wherein the defined slot format of the one BWP is indicated via a BWP configuration that can configure a pair of uplink and downlink BWPs, and further wherein a downlink BWP is linked by a same index with an uplink BWP as part of the BWP pair.

9. The method of claim 4, wherein the defined slot format of the one BWP is indicated via:
a BWP configuration that configures a pair of uplink and downlink BWPs; or
a BWP configuration including both downlink and uplink configurations for the FD communications and corresponding configuration parameters.

10. The method of claim 1, further comprising receiving radio resource control (RRC) signaling indicating the first slot format as a common slot format.

11. The method of claim 10, wherein the first slot format has flexible symbols that support bi-directional transmissions.

12. The method of claim 10, wherein the first slot format defines one or more symbols of a bi-directional FD symbol type.

13. The method of claim 1, further comprising receiving:
radio resource control (RRC) signaling indicating the first slot format as a UE-specific slot format; or
a downlink control information that configures the first slot format via a slot format indicator (SFI) index supporting FD symbols.

14. The method of claim 13, wherein:
the first slot format defines one or more symbols of a bi-directional FD symbol type; and
the one or more symbols of bi-direction FD symbol type override flexible symbols defined by a common slot format.

15. The method of claim 14, wherein:
the one or more symbols of bi-direction FD symbol type also override at least one of uplink or downlink symbols defined by the common slot format.

16. The method of claim 13, wherein, for FD operation, at least one of:
one or more downlink symbols override one or more uplink symbols defined by a common slot format; or
one or more uplink symbols override one or more downlink symbols defined by a common slot format.

17. The method of claim 13, wherein the SFI index indicates a combination of slot formats for the downlink BWP and the uplink BWP of the BWP pair.

18. The method of claim 17, wherein the downlink BWP and uplink BWP of the BWP pair are in different frequency bands, partially overlapped frequency bands, or the same frequency band.

19. The method of claim 17, wherein the slot formats indicated by the SFI index define downlink symbols associated with a downlink BWP and uplink symbols associated with an uplink BWP that support semi-persistent and dynamic transmissions.

20. The method of claim 17, wherein the slot formats indicated by the SFI index define flexible symbols for FD operation that support dynamic transmissions.

21. A method for wireless communications performed by a network entity, comprising:
- transmitting signaling for a user equipment (UE) to operate on at least one active bandwidth part (BWP) having a first slot format, wherein the at least one active BWP is part of a BWP pair consisting of an uplink BWP and a downline BWP, and wherein the first slot format is different from a slot format prior to the switch; and
- participating in full duplex (FD) communications with the UE in the at least one active BWP on symbols, based on the first slot format associated with the at least one active BWP.

22. The method of claim 21, wherein the first slot format defines one or more symbols of a bi-directional FD symbol type.

23. The method of claim 21, wherein:
- the method further comprises switching to the first slot format based on the switch to the at least one active BWP.

24. The method of claim 21, wherein different uplink and downlink BWP pairs are defined with different slot formats, at least some of which support the FD communications.

25. The method of claim 21, wherein the signaling comprises a downlink control information (DCI) that signals the UE to dynamically switch to the at least one active BWP and its corresponding slot format.

26. The method of claim 21, further comprising receiving radio resource control (RRC) signaling indicating the first slot format as a common slot format.

27. The method of claim 21, further comprising receiving:
- radio resource control (RRC) signaling indicating the first slot format as a UE-specific slot format; or
- a downlink control information that configures the first slot format via a slot format indicator (SFI) index supporting FD symbols.

28. The method of claim 27, wherein:
- the first slot format defines one or more symbols of a bi-directional FD symbol type; and
- the one or more symbols of bi-direction FD symbol type override flexible symbols defined by a common slot format.

29. An apparatus for wireless communication performed by a user-equipment (UE), comprising:
- an interface configured to obtain signaling for the UE to switch operation to at least one active bandwidth part (BWP) having a first slot format, wherein the at least one active BWP is part of a BWP pair consisting of an uplink BWP and a downlink BWP, and wherein the first slot format is different from a slot format prior to the switch; and
- a processing system configured to participate in full duplex (FD) communications in the at least one active BWP on at least some symbols, based on the first slot format associated with the at least one active BWP.

30. An apparatus for wireless communication performed by a network entity, comprising:
- an interface configured to output, for transmission, signaling for a user equipment (UE) to switch operation to at least one active bandwidth part (BWP) having a first slot format, wherein the at least one active BWP is part of a BWP pair consisting of an uplink BWP and a downlink BWP, and wherein the first slot format is different from a slot format prior to the switch; and
- a processing system configured to participate in full duplex (FD) communications with the UE in the at least one active BWP on symbols, based on the first slot format associated with the at least one active BWP.

* * * * *